United States Patent [19]

Rinas

[11] Patent Number: 5,641,246
[45] Date of Patent: Jun. 24, 1997

[54] CABLE LAYING APPARATUS

[76] Inventor: David Edward Rinas, 5213-48th Street, Lloydminster, Alberta, Canada, T9V 0S2

[21] Appl. No.: 384,670

[22] Filed: Feb. 6, 1995

[51] Int. Cl.$^6$ ............................... H02G 1/06; F16L 1/028
[52] U.S. Cl. ........................................... 405/174; 405/180
[58] Field of Search ..................... 405/174, 175, 405/176, 177, 180, 184

[56] References Cited

U.S. PATENT DOCUMENTS

| | | | |
|---|---|---|---|
| 4,871,127 | 10/1989 | Clark | 405/174 X |
| 4,890,957 | 1/1990 | Rinas. | |
| 5,156,355 | 10/1992 | Wadle | 405/174 X |

*Primary Examiner*—Tamara L. Graysay
*Assistant Examiner*—Frederick L. Lagman
*Attorney, Agent, or Firm*—Adrian D. Battison; Murray E. Thrift

[57] ABSTRACT

A method of laying cable such as fiber optic cable which cannot be twisted past an obstacle includes rewinding the cable from the inner end through an excavation under the obstacle from a first reel onto a second reel downstream of the obstacle. Both the first and second reels are of a type having first and second end flanges both of which are removable from the reel and a radially collapsible hub. During the rewinding step, the supply reel from the plough is positioned on end and the cable withdrawn from the inner turns of the winding and pulled off over end thus introducing a turn of twist. The key to the system is that when the second reel is unwound at the obstacle it is inverted relative to the first reel so that the second end is uppermost thus causing the twist to be subtracted and cancelled rather than summated.

1 Claim, 6 Drawing Sheets

CABLE LAYING APPARATUS

BACKGROUND OF THE INVENTION

This invention relates to a method of laying cables which allows the cable to be rewound downstream of an obstacle onto a second reel and which allows the cable to be laid into the ground without twist.

U.S. Pat. No. 4,890,957 of the present inventor issued Jan. 2, 1990 discloses a method which was a first attempt to provide a technique for the laying of cable such as fiber optic cables in which the cable is unwound from the first supply reel at an obstacle such as a rail bed and rewound onto a second reel downstream of the reel for continuation of the laying process using the second reel as the supply downstream of the obstacle.

This patent discloses particularly in FIGS. 9 through 12 an arrangement in which the cable is taken off from the supply reel with the inner end being pulled from the reel over one end after removal of one end flange and collapsing of the hub of the reel. The inner end is then drawn through an opening excavated at the obstacle and rewound onto the second reel.

At a second obstacle the technique shows the second reel being collapsed similarly to the first reel and the cable unwound from the inner end outwardly. The above patent discloses an arrangement in which each of the reels has only one end flange which is removable so that the other end flange is fixed. The patent states that the problem of ensuring the cable is laid without twist is solved by the arrangements as shown. To the contrary, however, this technique has unfortunately been found to be ineffective and instead exacerbates the problem of the twist. This occurs because, if the second reel is collapsed and the cable withdrawn therefrom at the second obstacle in a manner which is symmetrical to that of the first reel at the first obstacle then the twist, instead of being cancelled is indeed summated so that the cable wound again onto the first reel carries a severe twist which cannot be accommodated in the cable when laid.

Unfortunately therefore the first arrangement as disclosed in the above patent has been found to be unsatisfactory but this failure has only been determined after careful analysis of the matter and careful review of the techniques involved.

SUMMARY OF THE INVENTION

It is one object of the present invention, therefore, to provide an improved method which allows the cable to be laid after the second obstacle in a manner which is free from remaining twist.

According to one aspect of the invention there is provided a method of laying a cable in the ground comprising:

providing a first and a second reel onto which the cable can be wound, providing on each of the first and second reels a hub, a first end flange and a second end flange, arranging each of the first and second end flanges of each of the reels to be removable from the hub thereof, arranging each of the hubs to be radially collapsible from an initial winding diameter to a second collapsed diameter for release of an inner end of the cable;

winding the cable onto the first reel such that the cable is wound in revolutions around the hub of the first reel from an inner end attached to the first end flange of the first reel outwardly to an exposed outer end of the cable;

transporting the first reel across the ground on a transport vehicle, withdrawing cable from the outer end on the first reel so as to unwind from the first reel;

laying the withdrawn cable in a first laying step continuously in the ground along a path followed by the transport vehicle up to a position adjacent a first obstruction;

halting the unwinding of the cable from the first reel at the first obstruction, excavating an opening to pass the first obstruction;

removing the first reel from the vehicle, removing the first end flange of the first reel and collapsing the hub of the first reel, extracting and withdrawing the inner end of the cable from the first reel released by the removal of the first end flange and the collapsing of the hub, passing the inner end of the cable through the opening, unwinding the cable from the first reel with the inner end of the cable leading such that, as the cable is unwound from the first reel, one turn of twist is inserted into the cable for each revolution of cable unwound from the first reel;

attaching the inner end of the cable to the second end flange of the second reel positioned downstream of the first obstruction and rewinding the cable onto the second reel as it unwinds from the first reel;

attaching the second reel to the transport vehicle so as to be transported across the ground with the second reel being positioned on the transport vehicle with the second end flange thereof downwardly and the hub thereof standing upwardly from the second end flange, removing the first end flange from the second reel, withdrawing cable from the outer end thereof on the second reel, laying the withdrawn cable in a second laying step in the ground along a path followed by the transport vehicle carrying the second reel from the first obstruction;

halting the unwinding of cable at a second obstruction, excavating an opening to pass the second obstruction;

removing the second reel from the vehicle, reattaching the first end flange to the second reel, inverting the second reel such that the first end flange is downward and the hub thereof stands upwardly from the first end flange, removing the second end flange of the second reel, collapsing the hub of the second reel, extracting and withdrawing the inner end of the cable from the second reel which is released by the removal of the second end flange and the collapsing of the hub;

unwinding the cable from the second reel with the inner end of the cable leading such that, as the cable unwinds from the second reel, one turn of twist is inserted into the cable for each revolution of cable unwound from the second reel;

attaching the inner end of the cable onto the first reel positioned downstream of the second obstruction;

rewinding the cable onto the first reel as it is unwound from the second reel, the inner end of the cable being attached to the first end flange of the first reel;

a direction of insertion of twist in the cable as it is unwound from the second reel being opposite to the direction of twisting of the cable as it is unwound from the first reel such that the cable is wound onto the first reel free from twist for laying in the ground subsequent to the second obstruction.

One embodiment of the invention will now be described in conjunction with the accompanying drawings which are similar to the drawings of the above patent but are modified to show the method of the present invention:

BRIEF DESCRIPTION OF THE DRAWINGS

In the drawings like characters of reference indicate corresponding parts in the different figures.

DETAILED DESCRIPTION

Figure 5:
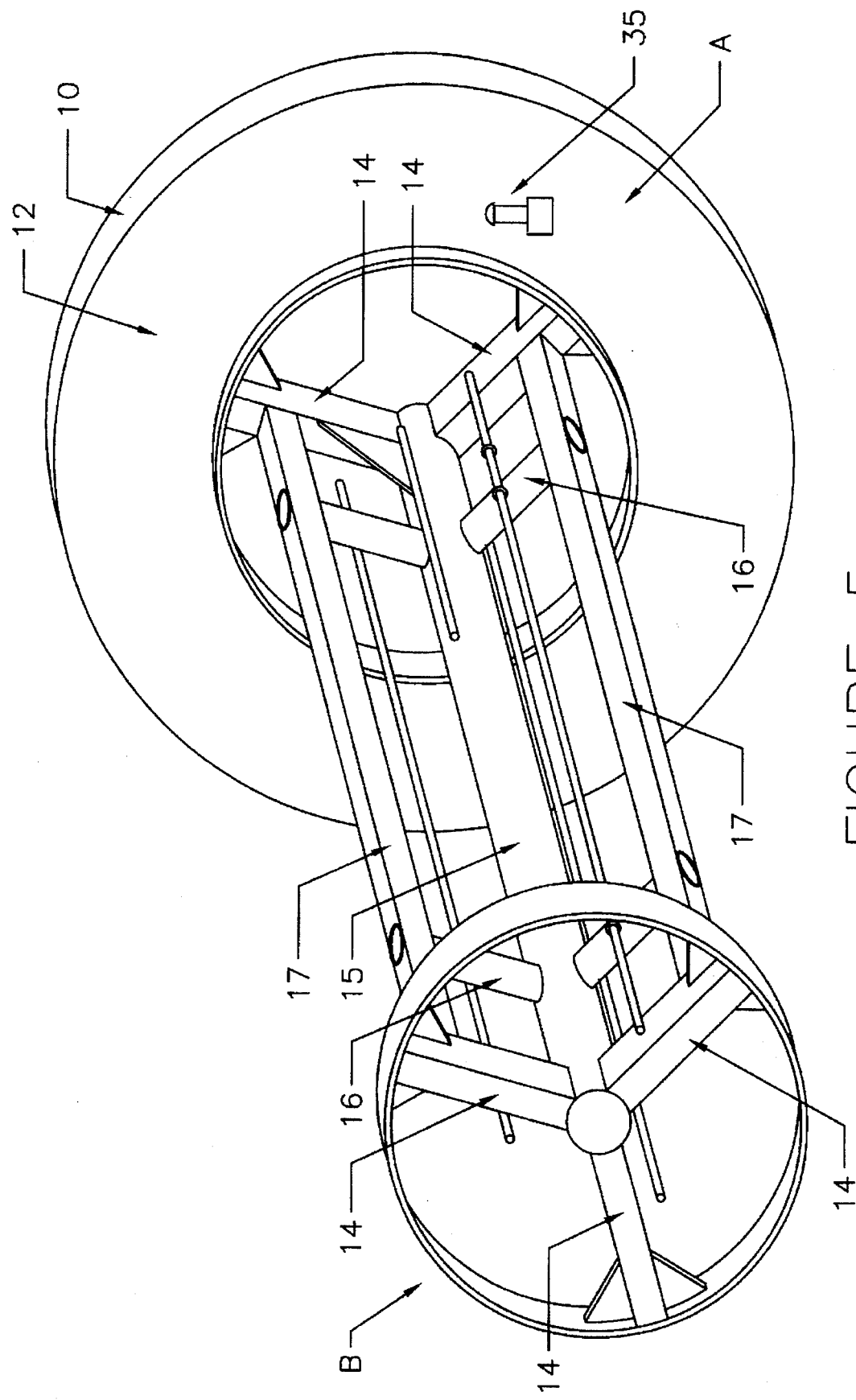
FIG. 5 is an isometric view of the first and second reels of FIGS. 1 through 4 showing one end flange removed and with the part cylindrical support surfaces of the hub removed.
Figure 6:
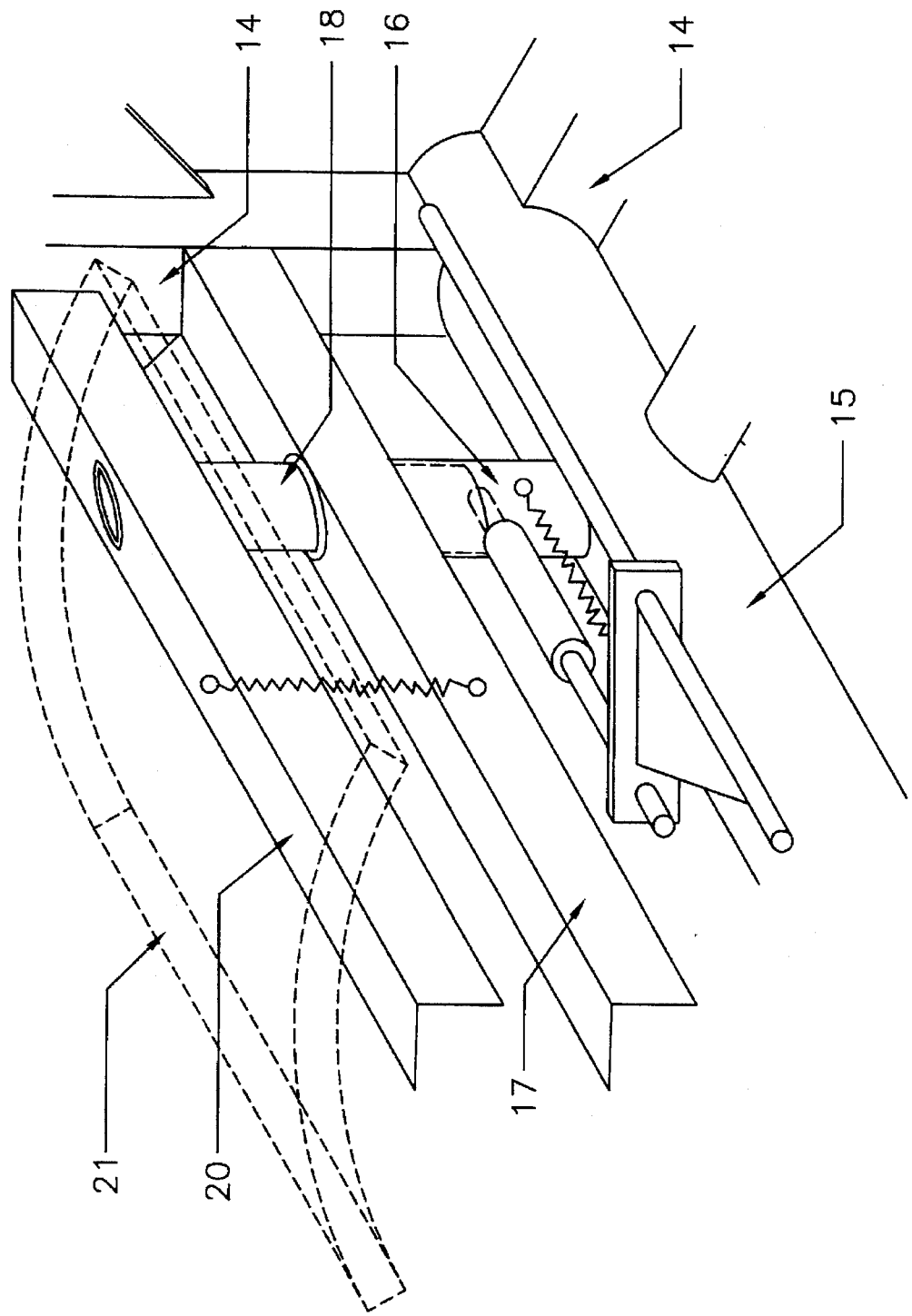
FIG. 6 is an enlarged view of one part of the reel of FIG. 5.

The construction of a reel is shown in FIGS. 5 and 6 and this comprises a pair of end flanges 10 and 11 each of which includes a disc section 12 and support ring 13. The disc section of the second flange 11 is removed for convenience of illustration to show the construction of the end flange and the hub. Each of the disc sections of the end flange is bolted to the ring 13 so as to define an inner face for engaging and supporting the wraps of cable on the reel.

Each of the rings 13 is supported by a plurality of arms 14 extending radially outwardly from a central shaft 15 with the hub extending along the full length of the reel then acting to support the arms 14 at each end.

The shaft 15 carries a further plurality of arms 16 at positions spaced inwardly from the arms 14. These arms 16 carry longitudinally extending beams 17 which extend along the reel and interconnect with the arms 14 outwardly beyond the arms 16. The arm 16 are formed from tubular metal and each can receive a sliding rod 18 movable longitudinally of the sleeve that is at right angles to the shaft 15. The rods 18 carry beams 20 so that there are three such beams 20 each arranged parallel to a respective one of the beams 17 and radially outwardly therefrom. Each of the beams 20 carries an arcuate section 21 of the hub so that the hub is formed in three pieces each of which is part cylindrical shape surrounding the shaft 15. Each of the arcuate pieces 21 can thus move radially inwardly and outwardly from an outer position of greater diameter than that of the ring 13 to an inwardly retracted position at the same diameter as the ring 13, in effect collapsing the hub to release the inner windings of the cable from support by the hub. A latching mechanism is schematically indicated at 22 and acts to hold the hub in each of the two positions. The details of the latching mechanism are not of importance to the present invention and therefore will not be described.

In general terms, therefore, the method of the present invention provides two reels each of which is of a construction shown in FIGS. 5 and 6 by which each of the first and second end flanges of the reels can be removed and the hub can be collapsed from an outer winding position to an inner collapsed or release position allowing release of the inner windings of the cable.

Turning therefore to the steps of the method illustrated schematically in FIGS. 1 through 4, the method includes the use of a conventional cable laying machine schematically indicated at 30 which includes a plough 31 and reel support arms 32 for supporting a supply reel and supplying a cable indicated at 33 to the plough for laying in the ground in conventional manner.

The method as illustrated in FIGS. 1 to 4 requires the provision of two of the reels as described above including a first reel 34 and a second reel 35. The steps to the method are as follows:

1. The first reel 34 has the cable 33 wound thereon in a series of coils wound around the hub and between the end flanges. The inner end of the cable is attached to the end flange A of the reel by an end coupler 35 attached to the end flange at the winding diameter of the hub. The coupling generally comprises a short length of sleeve into which the end of the cable is inserted and held in place by suitable clamping mechanism.

Figure 1:
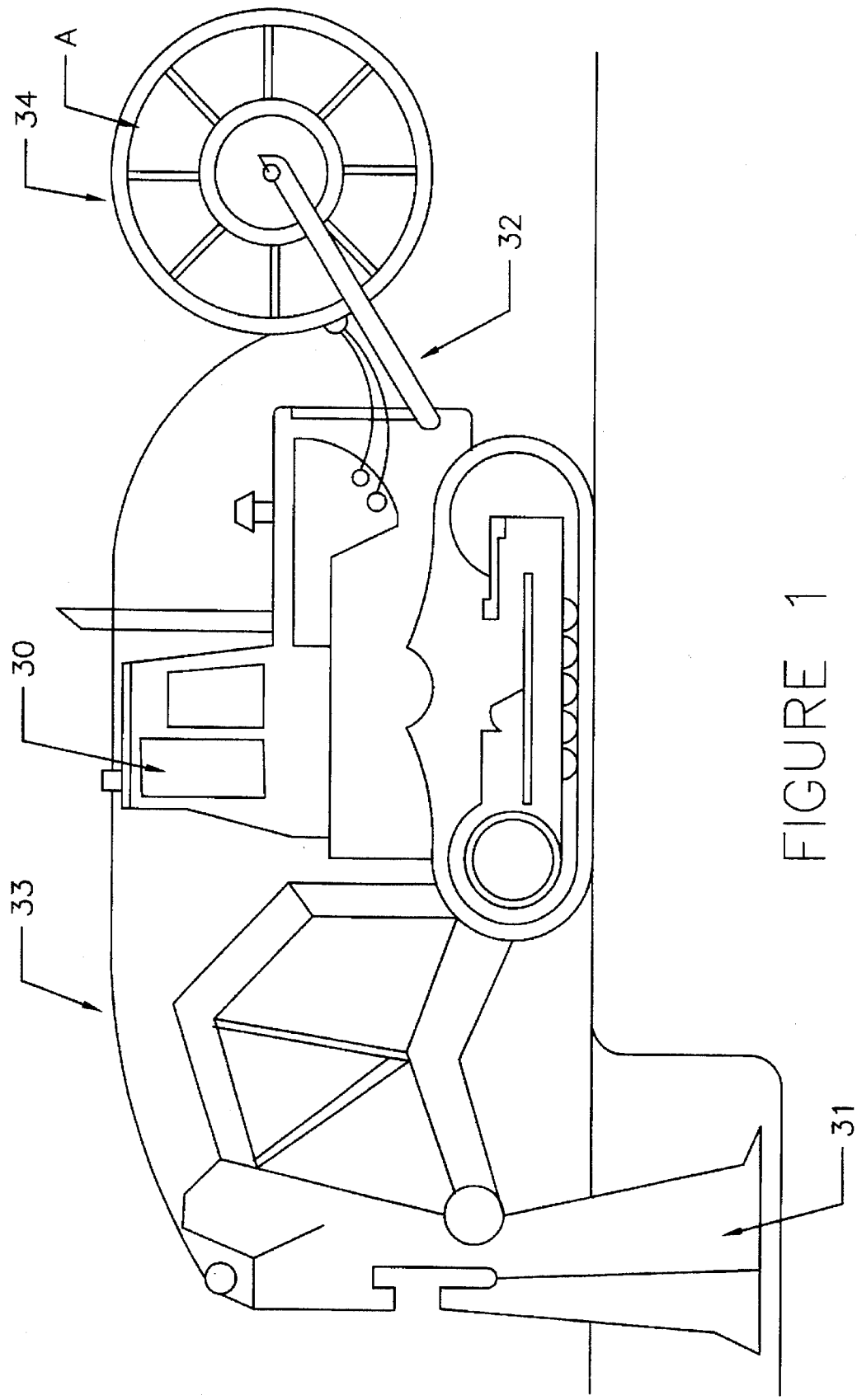
FIG. 1 is a side elevational view showing schematically the laying of a cable from a supply reel.

In the position shown in FIG. 1, the cable has been wound onto the first reel 34 without twist and simply is wrapped back and forth across the hub and between the end flanges. The reel is therefore mounted on the reel arms 32 and rotates as the cable is drawn off from one side of the hub. In this way the pulling of the cable from the reel causes the reel to rotate and does not apply any twist to the cable as it is withdrawn.

2. The laying of the cable continues in this manner until the vehicle 30 encounters an obstacle of a nature which the vehicle cannot bypass or pass over such as a rail bed, road or the like where it is necessary to pass the cable through an excavation constructed under the obstacle.

3. At the obstacle an excavation 36 is provided in which an opening 37 is generated under the obstacle. At this location the reel 34 is removed from the reel arms 32 and placed in position on the ground with the end flange B resting on the ground and the hub standing upwardly from the ground. The end flange A is then removed and this end flange carries the end of the cable so that this end is made immediately available by the removal of the end flange. The hub is then collapsed by operating the latch mechanism 22 and moving the arcuate sections of the hub inwardly as previously described. The inner end of the cable is then pulled away from the reel and inserted through the opening 37 and brought up to the reel 35 which is mounted on a rewind stand 38. The inner end of the cable is then attached to the end B of the reel 35 by a similar coupling member which is provided on the inner face flange B.

4. Once the inner end of the cable is attached to the second reel 35, the winding stand 38 is actuated to rotate the reel 35 about its axis while the cable is drawn toward the reel and laid across or over the hub to move back and forth along the length of the hub. A guide 39 is provided at the reel 34 so as to guide the cable being pulled out from the inner turns of the cable on the hub of the first reel 34. The cable can thus be unwound rapidly over the guide 39 and passes from the reel 34 under the obstacle is rewound on the reel 35. The cable is pulled off over the end of the reel 34 so that each rotation caused by one turn of the cable introduces one turn of twist into the cable as it is pulled from the reel 34. The cable carries this turn of twist as it is laid onto the reel 35 and is thus twisted on the reel 35 when it is wound.

5. When the rewinding of the cable is complete, all the cable is pulled from the reel 34 and thus extends from the vehicle 30 through the guides of the vehicle 30 to the obstacle and through the opening 37 to the reel 35 on the downstream side of the obstacle. The vehicle is then released from the cable and the vehicle is moved to a position downstream of the obstacle to continue the laying of the cable. The reel 34 is thus released from the system and can be removed at this stage.

Figure 3:
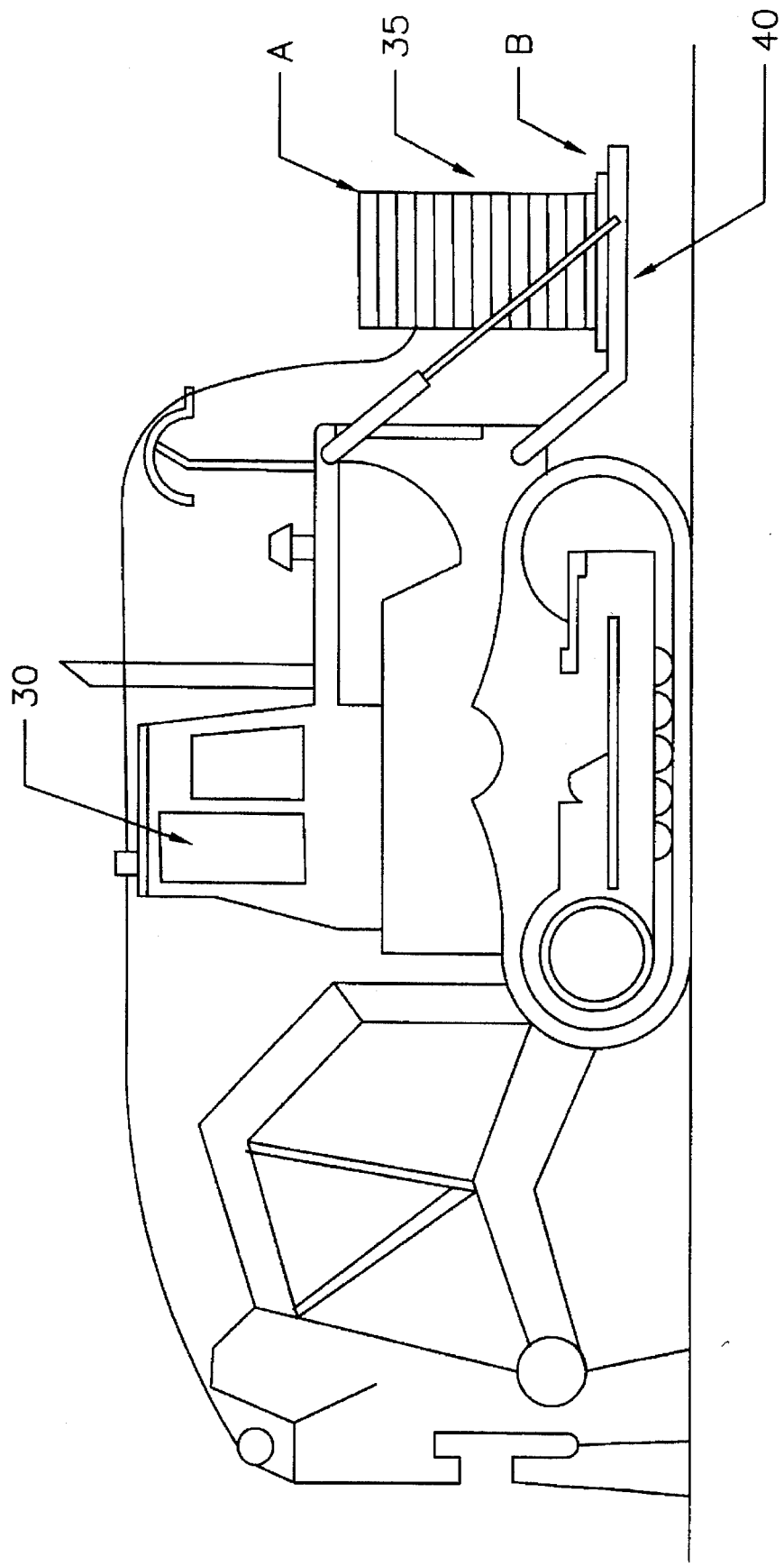
FIG. 3 is a side elevational view showing schematically a third step in the process of laying the cable downstream of the obstacle.
Figure 4:
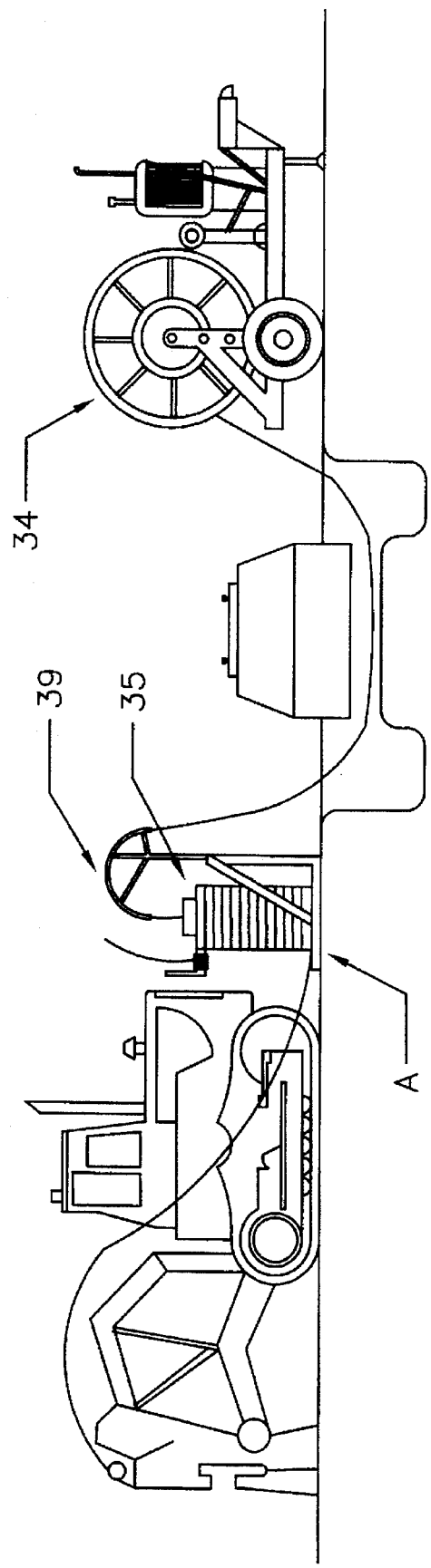
FIG. 4 is a side elevational view showing schematically the rewinding of the cable at a second obstacle.

6. The next step in the process is shown in FIG. 3 in which the laying of the cable is continued downstream of the obstacle by operating the vehicle 30 in the conventional laying technique. However during this second step the reel 35 on the vehicle 30 is mounted on a platform 40 so that one end flange of the reel 35 is carried in horizontal orientation with the hub thereof extending upwardly from the platform 40. Thus in the position shown in FIG. 3, the reel 35 is positioned on the platform so that a lower end is the end flange B of the reel 35. At this time the end flange A is removed as shown. As the inner end of the cable is attached to the end flange B, the removal of the end flange A does not release the cable and the structure remains stably supported on the hub and the end flange B. Thus the cable can be pulled over the end A and inserted into the guides of the laying vehicle 30. This over end movement of the cable over the end A causes the introduction into the cable of one turn of twist for each turn of cable around the hub and the arrangement of the reel with the pulling of the cable over the end A ensures that this turn of twist is directed in the opposite direction to the turn already standing in the cable as it is wound on the reel 35 so that the cable as it passes from the reel over the guides of the vehicle is free from twist. This laying of the cable continues up to a second obstacle as shown in FIG. 4.

Figure 2:
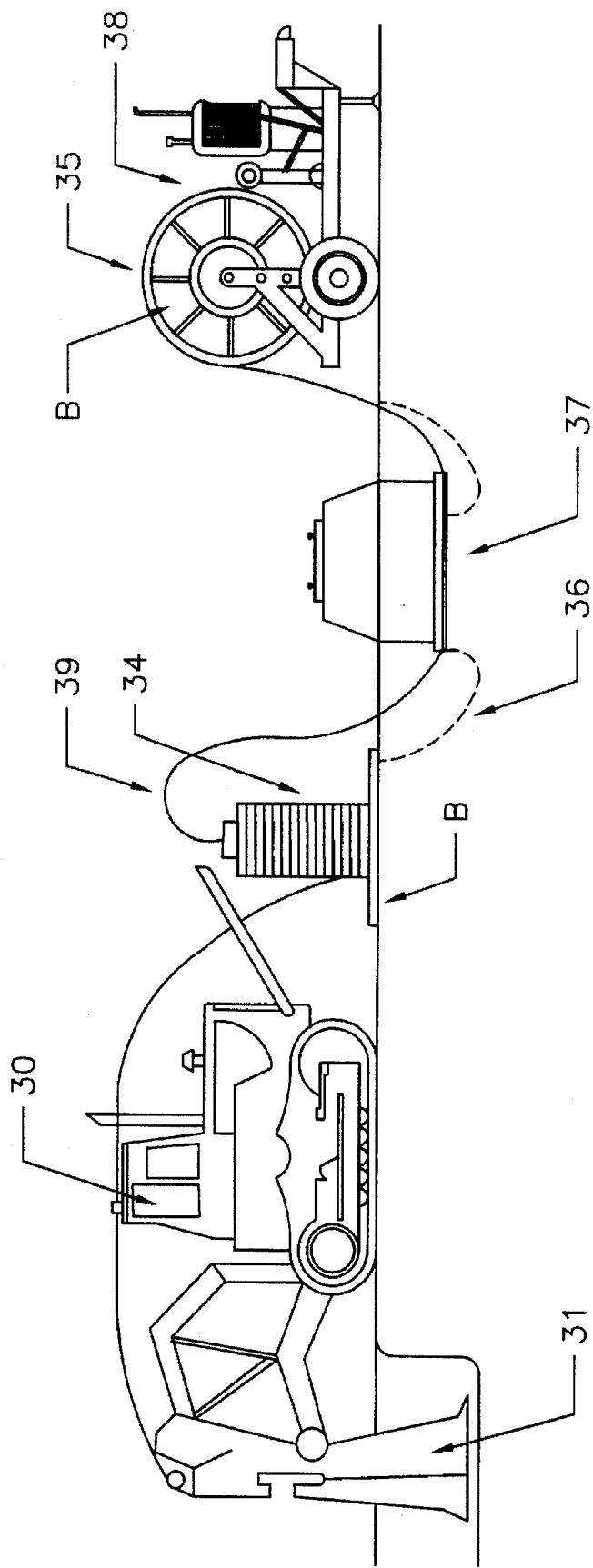
FIG. 2 is a similar side elevational view showing rewinding of the cable from the supply reel onto a second reel downstream of an obstacle.

7. At the second obstacle, the rewinding process previously described at the first obstacle shown in FIG. 2 is repeated so that the cable is unwound from the reel 35 and is rewound after passing through the opening of the second obstacle on the reel 34. The unwinding and rewinding is however carefully controlled to ensure that the cable as it is unwound cancels the twist in the cable as it stands on the reel 35. In order to achieve this, the end flange A is replaced on the reel 35 and the reel is inverted so that the end flange A lies on the ground. The hub stands upwardly from the end flange A and the end flange B is removed. The removal of the end flange B releases the inner end of the cable since the cable is attached to the end flange B and at the same time the hub is collapsed as previously described. The cable is then drawn over the guide 39 and passes from the reel 35 under the obstacle to the reel 34. The cable is then attached to the end flange A of the reel 34 in the manner symmetrical to that of FIG. 1. The unwinding of the cable from the reel 35 is then continued until the cable is fully wound on the reel 34 at which time the reel 35 is released from the cable and the cable can be disconnected from the vehicle and the vehicle removed to the downstream side of the second obstacle.

It will be noted, therefore, that it is necessary in this method for each of the end flanges to be removable from the reels and for the reels to be properly oriented as specifically described to ensure that the twist is removed by subtraction rather than summated. This technique is therefore clearly different from that of the previous patent in which the reels have only one removable flange thus causing the twist to be summated rather than subtracted in a system which cannot operate.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A method of laying a cable in the ground comprising:
providing a first and a second reel onto which the cable can be wound, providing on each of the first and second reels a hub, a first end flange and a second end flange, arranging each of the first and second end flanges of each of the reels to be removable from the hub thereof, arranging each of the hubs to be radially collapsible from an initial winding diameter to a second collapsed diameter for release of an inner end of the cable;

winding the cable onto the first reel such that the cable is wound in revolutions around the hub of the first reel from an inner end attached to the first end flange of the first reel outwardly to an exposed outer end of the cable;

transporting the first reel across the ground on a transport vehicle, withdrawing cable from the outer end on the first reel so as to unwind from the first reel;

laying the withdrawn cable in a first laying step continuously in the ground along a path followed by the transport vehicle up to a position adjacent a first obstruction;

halting the unwinding of the cable from the first reel at the first obstruction, excavating an opening to pass the first obstruction;

removing the first reel from the vehicle, removing the first end flange of the first reel and collapsing the hub of the first reel, extracting and withdrawing the inner end of the cable from the first reel released by the removal of the first end flange and the collapsing of the hub, passing the inner end of the cable through the opening, unwinding the cable from the first reel with the inner end of the cable leading such that, as the cable is unwound from the first reel, one turn of twist is inserted into the cable for each revolution of cable unwound from the first reel;

attaching the inner end of the cable to the second end flange of the second reel positioned downstream of the first obstruction and rewinding the cable onto the second reel as it unwinds from the first reel;

attaching the second reel to the transport vehicle so as to be transported across the ground with the second reel being positioned on the transport vehicle with the second end flange thereof downwardly and the hub thereof standing upwardly from the second end flange, removing the first end flange from the second reel, withdrawing cable from the outer end thereof on the second reel, laying the withdrawn cable in a second laying step in the ground along a path followed by the transport vehicle carrying the second reel from the first obstruction;

halting the unwinding of cable at a second obstruction, excavating an opening to pass the second obstruction;

removing the second reel from the vehicle, reattaching the first end flange to the second reel, inverting the second reel such that the first end flange is downward and the hub thereof stands upwardly from the first end flange, removing the second end flange of the second reel, collapsing the hub of the second reel, extracting and withdrawing the inner end of the cable from the second reel which is released by the removal of the second end flange and the collapsing of the hub;

unwinding the cable from the second reel with the inner end of the cable leading such that, as the cable unwinds from the second reel, one turn of twist is inserted into the cable for each revolution of cable unwound from the second reel;

attaching the inner end of the cable onto the first reel positioned downstream of the second obstruction; and rewinding the cable onto the first reel as it is unwound from the second reel, the inner end of the cable being attached to the first end flange of the first reel, thereby, a direction of insertion of twist in the cable as it is unwound from the second reel being opposite to the direction of twisting of the cable as it is unwound from the first reel such that the cable is wound onto the first reel free from twist for laying in the ground subsequent to the second obstruction.

* * * * *